United States Patent
Colson et al.

(10) Patent No.: US 10,676,219 B2
(45) Date of Patent: Jun. 9, 2020

(54) PRINTING PACKAGING IN EXPANDED MATERIAL

(71) Applicants: Shay C. Colson, Bellingham, WA (US); David A. Divine, Spokane, WA (US); David S. Thompson, Spokane, WA (US); Patrick Molvik, Newport, WA (US)

(72) Inventors: Shay C. Colson, Bellingham, WA (US); David A. Divine, Spokane, WA (US); David S. Thompson, Spokane, WA (US); Patrick Molvik, Newport, WA (US)

( * ) Notice: Subject to any disclaimer, the term of this patent is extended or adjusted under 35 U.S.C. 154(b) by 133 days.

(21) Appl. No.: 15/817,210

(22) Filed: Nov. 18, 2017

(65) Prior Publication Data
US 2018/0141685 A1 May 24, 2018

Related U.S. Application Data

(60) Provisional application No. 62/403,125, filed on Oct. 1, 2016, provisional application No. 62/424,390, filed on Nov. 19, 2016.

(51) Int. Cl.
*B65B 33/00* (2006.01)
*B65B 3/02* (2006.01)
(Continued)

(52) U.S. Cl.
CPC .............. *B65B 3/02* (2013.01); *B29C 64/112* (2017.08); *B29C 64/118* (2017.08);
(Continued)

(58) Field of Classification Search
CPC ............ B29C 64/00–40; B29D 99/001; B29D 99/0021; B29L 2031/712;
(Continued)

(56) References Cited

U.S. PATENT DOCUMENTS 3,986,640 A * 10/1976 Redmond .............. B65D 75/30
222/92
5,280,411 A * 1/1994 Dirks ................... H05K 7/1417
165/185

(Continued)

OTHER PUBLICATIONS

A Machine Learning Approach for Product Matching and Categorization, Petar Ristoski et al., IOS Press, 2016, 17 pages.
(Continued)

*Primary Examiner* — Leo B Tentoni

(57) ABSTRACT

A system and process of printing a package of expanded material (e.g., expanded starch, foam or other expanded material). The expanded material can be heated and extruded, poured, sprayed, or otherwise applied in malleable form that sets up to become a porous protective covering for an item to be packaged. In an example, a layer of expanded material is laid down, and the item in a protective covering (e.g., a plastic bag, sleeve, coating, etc.) is positioned on the layer of expanded material. Additional layers or expanded material may be applied, thereby encasing the item. The top surface of the expanded material may be flattened, such as by operation of a roller, press, or cutter. The top surface may be sprayed with a shellac sealant, paint, or other coating, to allow printing of a label on the top surface.

18 Claims, 12 Drawing Sheets

(51) Int. Cl.
| | |
|---|---|
| *B65D 1/40* | (2006.01) |
| *B33Y 30/00* | (2015.01) |
| *B33Y 40/00* | (2020.01) |
| *B33Y 80/00* | (2015.01) |
| *B65D 81/02* | (2006.01) |
| *B65B 57/12* | (2006.01) |
| *B65B 61/26* | (2006.01) |
| *B65B 59/00* | (2006.01) |
| *B65B 5/02* | (2006.01) |
| *B29C 64/124* | (2017.01) |
| *B29C 64/112* | (2017.01) |
| *B29D 99/00* | (2010.01) |
| *B29C 64/118* | (2017.01) |
| *B29C 64/153* | (2017.01) |
| *B33Y 10/00* | (2015.01) |
| *B65D 25/34* | (2006.01) |
| *B65D 65/46* | (2006.01) |
| *B29L 31/00* | (2006.01) |

(52) U.S. Cl.
CPC .......... *B29C 64/124* (2017.08); *B29C 64/153* (2017.08); *B29D 99/001* (2013.01); *B29D 99/0021* (2013.01); *B33Y 30/00* (2014.12); *B33Y 40/00* (2014.12); *B33Y 80/00* (2014.12); *B65B 5/02* (2013.01); *B65B 57/12* (2013.01); *B65B 59/001* (2019.05); *B65B 61/26* (2013.01); *B65D 1/40* (2013.01); *B65D 81/022* (2013.01); *B29L 2031/712* (2013.01); *B29L 2031/7126* (2013.01); *B29L 2031/7162* (2013.01); *B33Y 10/00* (2014.12); *B65B 2210/04* (2013.01); *B65D 25/34* (2013.01); *B65D 65/466* (2013.01); *B65D 2203/00* (2013.01); *Y02W 90/11* (2015.05)

(58) Field of Classification Search
CPC ..... B29L 2031/7126; B29L 2031/7162; B65B 5/02; B65B 33/00; B65B 55/20; B65B 59/001; B65B 61/26; B65B 2210/04; B65D 25/34; B65D 65/466; B65D 2203/00
USPC .............. 264/45.1, 113, 129, 308, 401, 497; 53/131.1, 411, 503, 504
See application file for complete search history.

(56) References Cited

U.S. PATENT DOCUMENTS

| | | | |
|---|---|---|---|
| 6,107,371 A | 8/2000 | Roesser et al. | |
| 8,239,169 B2 | 8/2012 | Gregory et al. | |
| 9,248,611 B2 | 2/2016 | Divine et al. | |
| 2002/0079601 A1 | 6/2002 | Russell et al. | |
| 2004/0117273 A1 | 6/2004 | Henderson | |
| 2005/0173838 A1* | 8/2005 | Priedeman, Jr. ...... | B29C 64/124 264/401 |
| 2005/0256776 A1 | 11/2005 | Bayoumi et al. | |
| 2015/0048554 A1* | 2/2015 | Karrer .................. | B29C 64/106 264/401 |
| 2015/0052025 A1 | 2/2015 | Apsley et al. | |
| 2015/0099087 A1* | 4/2015 | Reznar ................. | B29C 64/112 264/401 X |
| 2015/0145158 A1* | 5/2015 | Levine ................. | B29C 64/112 264/308 X |
| 2015/0249043 A1 | 9/2015 | Elian et al. | |
| 2016/0098730 A1 | 4/2016 | Feeney | |
| 2016/0122043 A1 | 5/2016 | Divine et al. | |
| 2016/0152358 A1 | 6/2016 | Divine et al. | |
| 2016/0280403 A1 | 9/2016 | Colson et al. | |
| 2017/0046806 A1 | 2/2017 | Haldenby et al. | |
| 2017/0253354 A1 | 9/2017 | Colson et al. | |
| 2017/0253401 A1 | 9/2017 | Bouthillier | |
| 2017/0257358 A1 | 9/2017 | Ebrahimi et al. | |

OTHER PUBLICATIONS

SAP and UPS work to attract partners to join Distributed Manufacturing early adopter program, Printer and 3D Printing News, http://www.3ders.org/articles/20160922-sap-and-ups-work-to-attract-partners-to-join-distributed-manufacturing-early-adopter-program.html, Sep. 22, 2016, 8 pages.

3D Hubs, Wikipedia, https://en.wikipedia.org/wiki/3D_Hubs, accessed on Feb. 3, 2018, 2 pages.

3D Hub, Your go-to service for ordering custom parts online, https://www.3dhubs.com/how-to-3d-print, accessed on Feb. 3, 2018, 2 pages.

Thingiverse features "Get This Printed" button to allow users to order 3D prints directly via 3D Hubs, Printer and 3D Printing News, http://www.3ders.org/articles/20150421-thingiverse-features-get-this-printed-button-order-3d-prints-directly-via-3d-hubs.html, 8 pages, (2015).

Notification of Transmittal of the International Search Report and Written Opinion of the International Searching or Authority, dated Jan. 18, 2018, from PCT/US17/54643, 17 pages.

How 3D printing empowers packaging operations, By Lisa McTigue Pierce, Optimization (accessed at http://www.packagingdigest.com/optimization/how-3d-printing-empowers-packaging-operations141014), Oct. 15, 2014, 3 pages.

Packaging 3D Print—The Global Upheaval That's About to Occur, by John Hauer, 3DPrint.com (accessed at http://3dprint.com/80700/packaging-3d-print/), Jul. 12, 2015, 8 pages.

Adobe co-develops 3D printing software to improve structural designs, By Justin Rubio (accessed at http://www.theverge.com/users/Justin%20Rubio), Sep. 20, 2012, 3 pages.

Stava et al., Stress Relief: Improving Structural Strength of 3D Printable Objects, available at least as early as Oct. 1, 2013, 11 pages.

3D Printing, Opportunities in Packaging, Get3DSmart, by John Hauer, available at least as early as Aug. 6, 2016, 69 pages.

Port of Rotterdam Launches Blockchain Lab, BTCMANGAGER, by Joseph Young, Sep. 29, 2017, 6 pages.

Flexport's epic plan to build a freight empire with its $110M raise, TechCrunch, by Josh Constine, Oct. 6, 2017, 10 pages.

SenseAware, a FedEx innovation, accessible at http://www.senseaware.com/how-it-works/, available at least as early as Oct. 2, 2017, 5 pages.

FedEx Introduces SenseAware, the Next Generation Supply Chain Information Platform, accessible at http://about.van.fedex.com/newsroom/fedex-introduces-senseaware-the-next-generation-supply-chain-information-platform/, Nov. 17, 2009, 6 pages.

SenseAware is FedEx's IoT response to supply chain optimization, RCRWireless News, by Phillip Tracy, available at https://www.rcrwireless.com/20160929/big-data-analytics/fedex-iot-tag31, Sep. 29, 2016, 5 pages.

Digital Print Solutions for Smart Packaging, Xerox, available at https://www.xerox.com/en-us/digital-printing/packaging-solutions/smart?CMP=PPC-PSG&HBX_PK=Smart_Packaging&HBX_OU=50&ADGRP=Packaging_-_Digital_Smart_Packaging_, available at least as early as Oct. 3, 2017, 5 pages.

Getting Smart with Digitally Printed Packaging, Xerox, available at https://www.xerox.com/en-us/digital-printing/packaging-solutions, available at least as early as Oct. 3, 2017, 6 pages.

Finding Blockchain-Based Security Solutions for the 3D Printing Economy, Bitcoin Magazine, by Giulio Prisco, available at http://www.nasdaq.com/article/finding-blockchain-based-security-solutions-for-the-3d-printing-economy-cm828884, Aug. 8, 2017, 3 pages.

Trusted Internet of Things and Smart Supply Chain Solutions, Chronicled, available at https://www.chronicled.com/, available at least as early as Aug. 9, 2017, 3 pages.

Blockchain and the future of retail, ETRetail.com, by Singaravelu Ekambaram and Lata Varghese, Aug. 22, 2017, 6 pages.

(56) References Cited

OTHER PUBLICATIONS 3D printed Smart Tags ensure 100% authenticity of collectible shoes, www.3ders.org, by Kira, Mar. 10, 2016, 12 pages.

Cubichain Stores Data of 3D Printed Aircraft Parts in Blockchain, 3D Printing, Aerospace 3D Printing, Business, By joseph Young, Dec. 7, 2016, 9 pages.

Voodoo Manufacturing, Small-Batch Manufacturing With High-Volume 3D Printing, Voodoo Manufacturing, Available at least as early as Sep. 10, 2017, 20 pages.

Pharma Giants Use Ethereum Network to Prevent Counterfeit Medicine, BTCMANAGER, by Joseph Young, Sep. 25, 2017, 4 pages.

C3IOT, AI & IoT Software Platform for Digital Transformation, available at https://c3iot.com/, available at least as early as Aug. 18, 2017, 5 pages.

Smart sensors improve packaging machinery performance, Packaging Digest-Automation, by Mark Langridge, Apr. 15, 2015, 6 pages.

Smart Contracts: 12 Use Cases for Business & Beyond, Prepared by: Smart Contracts Alliance—In collaboration with Deloitte, available at http://bloq.com/assets/smart-contracts-white-paper.pdf, Dec. 2016, 56 pages.

Technology Innovation Profile: 3D Printing and Going Local, FedEx HealthCare Solutions, http://www.fedex.com/us/healthcare/knowledge-center/technology/technology-innovation-profile-3d-printing-and-going-local.html, available at least as early as Oct. 6, 2017, 3 pages.

3D Printing will make manufacturing local, Epson Insights, Jun. 12, 2017, 5 pages.

The race to connect smart contracts to the real world, American Banker, By Brian Patrick Eha, Aug. 7, 2017, 8 pages.

Willett et al., Processing and properties of extruded starch/polymer foams, Plant Polymer Research Unit, US Department of Agriculture, National Center for Agricultural Utilization Research, Agricultural Research Service, Polymer 43 (2002), pp. 5935-5947.

\* cited by examiner

PRINTING PACKAGING IN EXPANDED MATERIAL

RELATED APPLICATIONS

This patent application claims priority to U.S. provisional application No. 62/424,390, titled "Packaging in Expanded Starch Material", filed on Nov. 19, 2016, which is incorporated herein by reference.

BACKGROUND

One function of product packaging is to protect a product during shipping. Good packaging requires time, proper materials, and skill in order to adequately package items for shipping. In some examples, inadequate packaging design and/or inadequate budget for packaging results in product damage. Also, packaging items in one-size-fits-all packaging or a few standard sized packages results in wasted space in the package, items that can move around and become damaged during shipping, and additional shipping cost to ship oversized boxes that include large amounts of air and/or packing materials (e.g., bubble wrap, air pillows, Styrofoam peanuts, etc.). To combat these issues, custom boxes or other custom packaging is sometimes designed for a specific item or product. However, this custom packaging is more expensive, which tends to lessen overall profitability.

Accordingly, there is a continued need for improved packaging solutions that solve some or all of the problems noted above.

DETAILED DESCRIPTION

Figure 1:
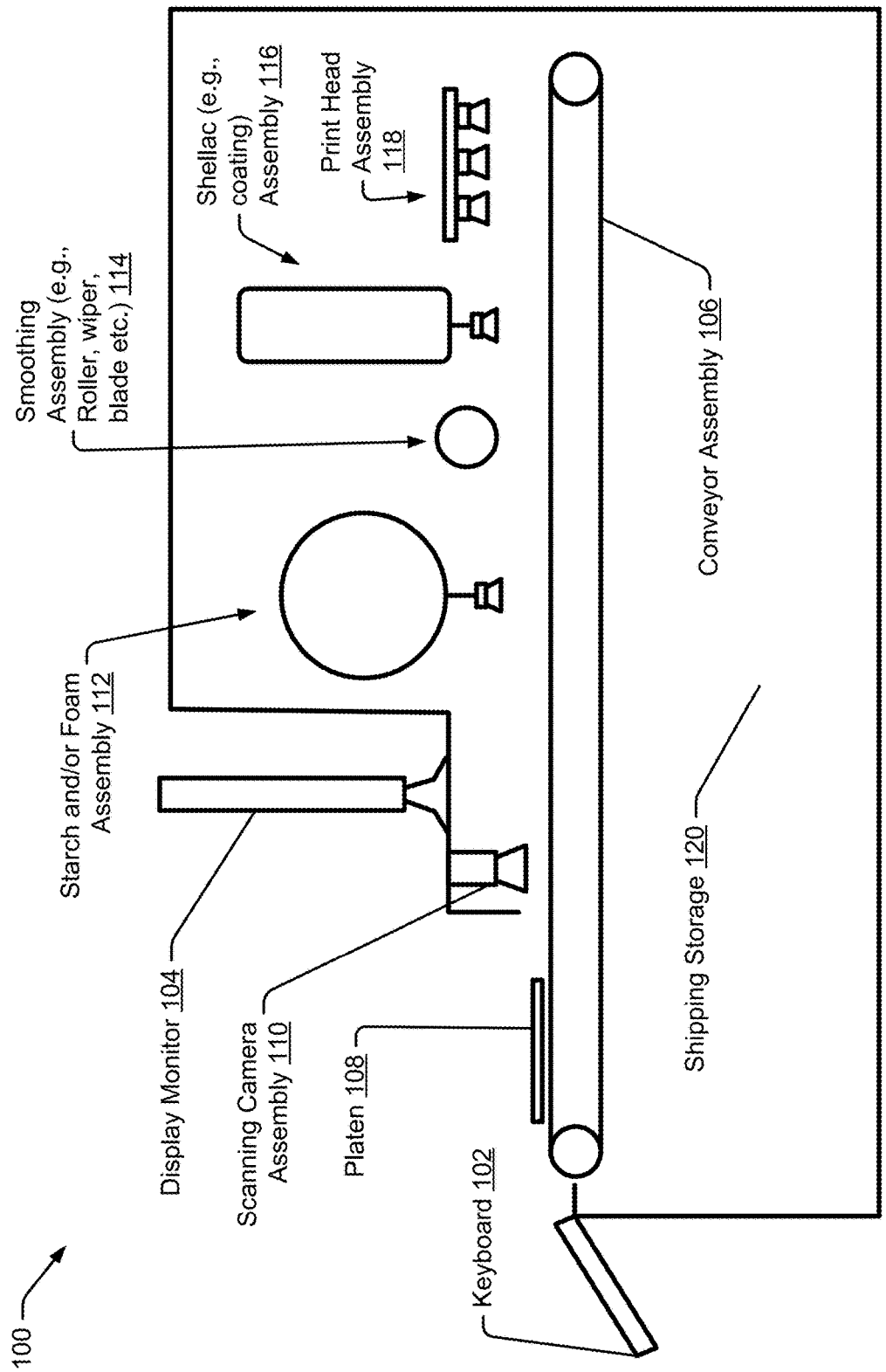
FIG. 1 is a diagram showing an example expanded starch packaging system.

This application describes example systems and techniques by which packages can be printed or otherwise created on-demand through an additive manufacturing process. The techniques described herein can apply to any expanded material. An expanded material is a porous material (e.g., open or closed cell foams, meshes, etc.) having pockets, voids, or interstitial spaces filled with air or other gas. The expanded material may comprise natural (e.g., starch, cellulose, cretin, etc.) and/or synthetic (e.g., polymeric) materials. In some examples, the expanded materials may comprise starch material such as a material made from corn, wheat, potato, rice, other naturally occurring or synthetic starch material. In several examples, ranges of densities for the expanded material may be approximately 0.1 to 1.0 lb./ft3, between about 0.3 and about 0.6 lb./ft3, or 1.0 to 3.0 lb./ft3. The expanded material can be reinforced by natural and/or synthetic fibers (e.g., hemp, cellulose, carbon, glass, polymeric, or other fibers). The expanded material may be produced and deposited or applied using an additive manufacturing process (e.g., 3D printing) and/or may be produced using a less precise techniques including spray nozzles in a free-form manner, or within confines created by a frame, tray, form, or other structure.

In some examples, the frame, tray, form, or other structure may be integrated with and form part of the finished package. In other examples, the frame, tray, form, or other structure may be used to form the expanded material during packaging and then removed prior to shipping. In some examples, the frame, tray, form, or other structure may be formed by a traditional 3D printing process and the expanded material may be printed into, on, and/or around the frame, tray, form, or other structure to form the package and to secure the packaged item within the frame, tray, form, or other structure. By way of example and not limitation, traditional 3D printing processes can include material extrusion (e.g., fused deposition modeling or FDM), vat polymerization (e.g., stereo lithography or SLA, digital light processing or DLP, continuous digital light processing or CDLP), material jetting (e.g., material jetting or MJ, nano-particle jetting or NPJ, drop on demand or DOD), binder jetting or BJ, powder bed fusion (e.g., multi jet fusion or MJF, selective laser sintering or SLS, direct metal laser sintering or DMLS, selective laser melting or SLM, electron beam melting or EBM), direct energy deposition (e.g., laser engineering net shape or LENS, electron beam additive manufacturing EBAM), sheet lamination (e.g., laminated object manufacturing or LOM), etc.

In some examples, the process may be performed using a print head having one or more nozzles, an optical scanning device, a starch boiler, an optional shellac reservoir, a smoothing roller, and an additional print-head for two-dimensional printing (e.g., ink jet or laser printer for printing postage, address label, etc.). Additionally, in some examples, the process may include a conventional 3D printer, such as suitable for any one or more of the foregoing conventional 3D printing processes, to print at least a portion of a package in combination with the expanded starch printing process.

In some examples, the package may include a base composed of paper card (or card of some other material such as paper mulch, biodegradable plastic film, cardboard, corrugated, plastic, metal, foil, etc.), which can, in some examples, contain printed information, branding, etc. This base can be composed of a set of particularly sized elements (e.g., various sizes of cards or other base elements that would accommodate the packaging of various items), or it can be custom cut to the desired size for each item, or it could be cut from a continuous roll of material (e.g., cardstock, paper, sheet metal, foil, etc.) on-demand. The base may be substantially planer (e.g., a sheet), or may be three-dimensional (e.g., a pan, tray, box, bowl, cylinder, etc.). In examples that include a 3D printer, the base of the package may be 3D printed. Thus, the base of the package may take any desired two or three-dimensional shape. The size and shape of the base may be determined based at least in part on a size, shape, and/or weight of the item to be packaged.

An optical scanning device may be used to determine the dimensions of the item for which packaging is desired. This information is then conveyed to the print-head nozzles (e.g., directly or via a computing device or network) to calibrate the print areas for the expanded starch material, which are then applied in one or more layers onto the base of the package utilizing the print head. The number of layers and/or the thickness of each layer may be determined based at least in part on a size, shape, and/or weight of the item to be packaged. For instance, a thicker layer of starch material may be applied for heavier items, while a thinner layer may be used for lighter weight items. As another example, a thicker layer of material may be used if the item has sharp corners than if the item has rounded corners.

The base material can be moistened to increase adhesion of the expanded starch material to the base. Alternatively, a mechanical adhesion can be achieved by utilizing roughly textured card or material for the base, and/or a heat-activated bioglue or other adhesive may be utilized for the same purpose.

The expanded starch material is then printed (e.g., by extrusion, pouring, or spraying) from the starch boiler to apply an initial layer of material across the base of the package. After one or more initial layers are deposited across the entire surface of the base, the item may be added, and one or more additional layers of material may be applied around the item for which packaging is desired. The one or more additional layers of material can either be applied across the entire width (including across the item itself, which may be protected by protective envelope, bag, coating, or other barrier layer), or only around a perimeter of the item (i.e., in a negative of the item). In the latter case, less than all nozzles of the print head may be used to print around the item (e.g., those nozzles that are not directly above the item may print, while those directly above the item may refrain from printing the one or more additional layers). In some examples, the items may be packaged using a two-layer approach (in which the item is effectively sandwiched between two layers of the starch material) or three-layer approach (in which the item has a layer of starch on top, a layer of starch on the bottom, and a layer of starch surrounding the item on the sides) to create the packaging. In some examples, such as in the case of larger (e.g., taller) items, more than three layers of starch material may be used (e.g., layered one on top of the other) to package the item.

In some examples, the print head may comprise one or more nozzles. In some examples, the print head may include a linear array of nozzles (e.g., two or more nozzles arranged along a width of a print area) over a least a portion of a print width and up to a maximum print width of the system. In some examples, the print head may include a two-dimensional array of nozzles. The print head may be movable in one, two, or three dimensions to apply multiple layers of expanded starch material. Additionally, in some examples, the print head may have up to six degrees of freedom to adjust an orientation of the print head. Additionally or alternatively, in some examples, a platen on which the base is supported may be movable in one, two, or three dimensions to adjust a height of the package in the print area and to move the item longitudinally or laterally in the print area relative to the print heard.

Optionally, a final layer of expanded starch material may be applied over the entire width of the package including across top of the item, and the top of the material may be leveled and smoothed using a smoothing roller, press, form, or similar device. In some examples, a top of the package may be trimmed using a cutter (e.g., saw, shears, hot wire, laser, or water jet) to provide a smooth planar surface.

A top of the package may then be applied on which shipping information, postage, etc. has been (or can be) printed. The top of the package may comprise any of the materials and/or configurations described for the base of the package. Optionally, soy-based inks can be utilized to create a completely compostable, biodegradable package. In still other examples, the package may omit the base and/or the top sheets and the top and bottom surfaces of the package may be formed of expanded starch material.

Additionally or alternatively, the base can be constructed with folding components that raise or fold up on each side to provide protection for the expanded starch material on the sides of the package, and are completed by the addition of a final card across the top of a completed package.

If a folding base is not desired, a quick drying water-resistant shellac, sealant, or other coating can be applied across exposed regions of expanded starch material, thereby rendering the final package a degree of water, weather, and damage resistance equaling or exceeding traditional corrugated cardboard packaging. In some examples, the shellac, sealant, or other coating may be biodegradable.

In some examples, a standard adhesive packaging label can be applied directly to the top of the expanded starch material. Additionally or alternatively, a laser or other device can be used to etch, burn, inscribe, or otherwise imprint the postage, shipping, branding, custom quick response (QR) code, barcode, or other identifying information directly into the expanded starch material prior to the application of the shellac or other material. Additionally or alternatively an ink jet, dot matrix, or other printer may be used to print the postage, shipping, branding, custom quick response (QR) code, barcode, or other identifying information onto one or more surfaces of the package before or after application of the shellac, sealant, or other coating. In examples including a conventional 3D printer, one or more surfaces of the package may be 3D printed.

The print head can be built to any desired width by including any number of nozzles, whereby nozzles can be independently controlled to print at various widths. In some examples, less than all the nozzles of the print head may be used for a given package. In some examples, the print head may have multiple nozzles of different sizes (e.g., differing opening diameters). The number, shape, and/or size of nozzles may be configurable. This allows for the printing apparatus to be built to a custom size, or for larger machines to accommodate packaging of smaller items.

Figure 11:
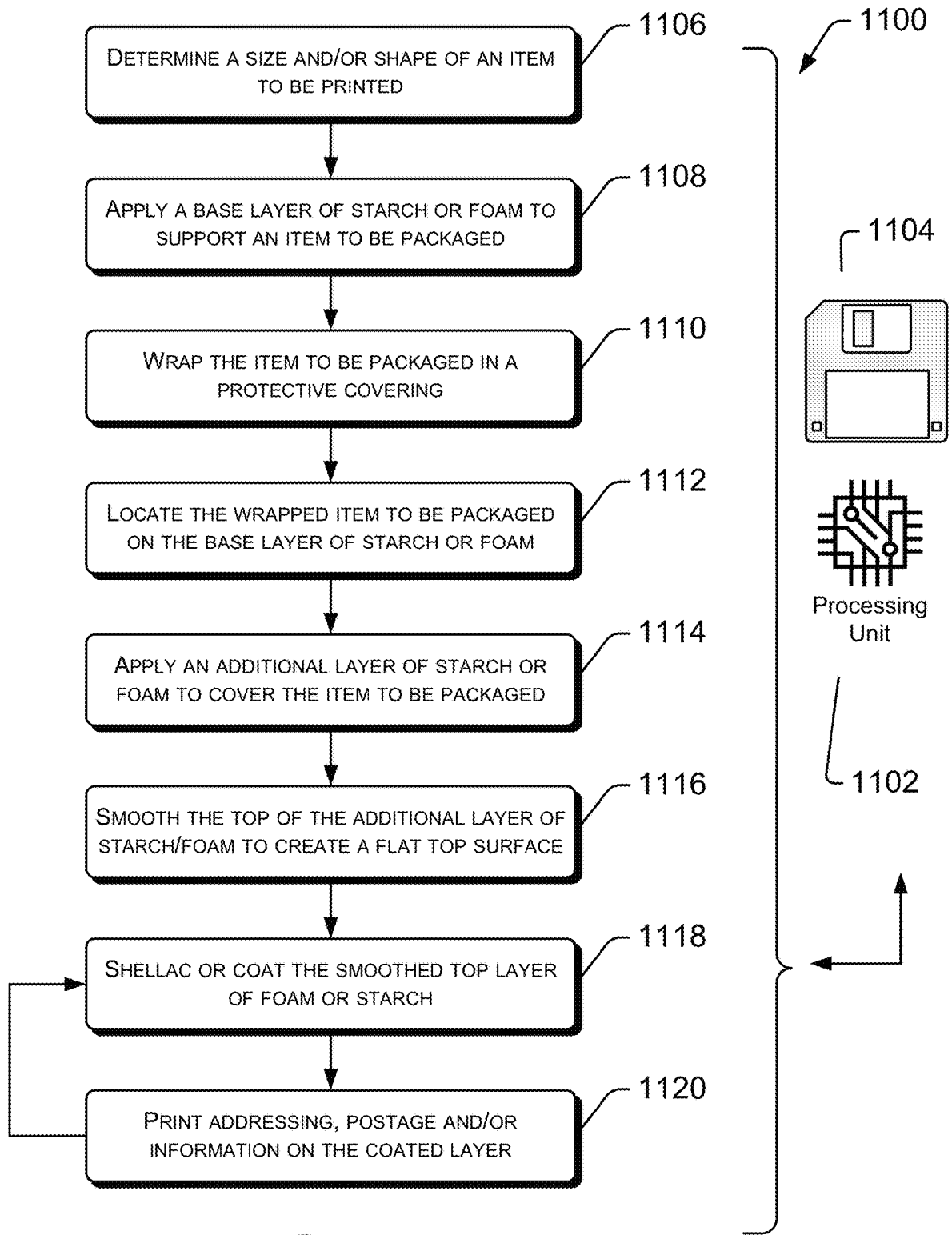
FIG. 11 is a flow diagram showing example techniques by which the expanded starch packaging and printing system may be operated.
Figure 12:
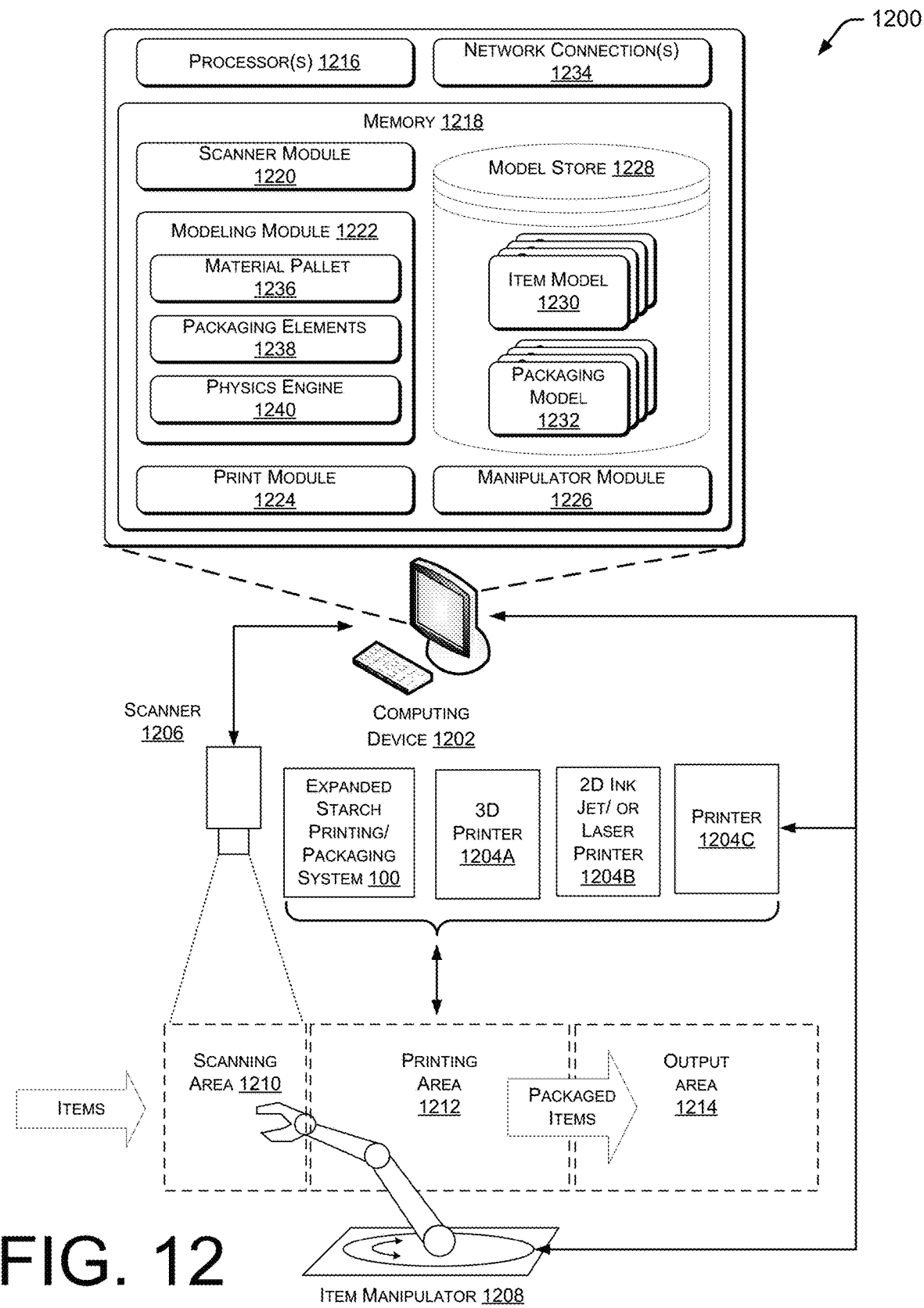
FIG. 12 is a diagram showing an example manufacturing, printing and labeling system, synergistically integrating a plurality of structures, methods, techniques and technologies such as the expanded starch packaging system of FIG. 1.

One example of an expanded starch packaging system is shown in FIGS. 1-10. One example of techniques used to operate an expanded starch packaging system is shown in FIG. 11. An example packaging line including an expanded starch packaging system is shown in FIG. 12.

Example Structure and Design

FIG. 1 is a diagram showing an example expanded starch packaging system 100. In the system 100 shown, an item to be packaged is protected by protective layer (e.g., paper or plastic sleeve, a plastic bag, envelope, coating, or other release layer). However, in other examples, the protective layer may be omitted. The protected item is placed on a layer of foam (e.g., a starch material), and then encased in additional foam or starch. The starch is smoothed by a roller or press, and may be covered (e.g., sprayed or rolled) with a layer of shellac or plastic or other covering. The covering may be printed (e.g., by ink jet, dot matrix, laser, 3D printer, etc.) to include addressing, postage, and/or other indicia such as advertising, decoration, or markings such as "fragile."

The system 100 may provide a user interface with for an operator that may include a keyboard 102, a display screen 104, a touch screen, touch pad, and/or other physical and/or virtual interfaces. The system may also include a processor and memory, in which are defined software statements and data (see, e.g., FIG. 11). In the example system shown, a conveyor 106 moves a platen 108 through the system 100. An item to be packaged may be supported by the platen 108, as it is moved through the system. At different locations in the system, and/or times in the process, the item may be processed by various assemblies within the system 100, which perform various tasks involved in the packaging system. Additionally or alternatively, the item and/or package may be conveyed throughout the system by one or more robotic arms or other material handling equipment.

A scanning assembly 110 may be configured to determine a size, shape, and/or location of the item to be packaged. The scanning assembly may include a camera, a depth sensing camera, an optical scanner, a laser scanner, or any other scanning devices to determine the size, shape, and location of the item and/or package. The scanning assembly 110 may create an image that is processed to determine size of the item and thus requirements of the package. In some applications, the scanning assembly 110 and associated software may recognize characteristics of the item to be packaged, such as what it is, whether it is fragile or robust, whether is it valuable, already encased in retail packaging or some type of protective covering, etc. In an example, the scanning assembly may recognize the item as an antique pocket watch, as being fragile, and as requiring adequate packaging.

An expanded material assembly 112 is configured to spray, pour, and/or spread, etc., a layer of starch or other expanded material under the item to be packaged, and then around the item to be packaged. The expanded material may be made by heating a mixture of starch and water to an extrudable, pourable, and/or spray-able consistency. Thus heated, the mixture is printed (e.g., by extruding, pouring, spraying, and/or otherwise expelling) the mixture from the boiler to the desired locations. When the mixture dries, sets-up and/or cools it forms a light-weight and protective shell for the item. In some examples, the mixture may set up substantially immediately upon being printed due to the heat and reduction in pressure as the material exits the boiler. In some examples, the mixture may be dried using ethanol to provide a porous, high surface area form of expanded starch. By way of example and not limitation, example formulations and methods of preparing expanded starch materials can be found in U.S. Pat. No. 6,107,371 to Roesser et al., which is incorporated herein by reference. Additional non-limiting examples of techniques for preparing and extruding expanded starch materials can be found in Willett et al., Processing and properties of extruded starch/polymer foams, Plant Polymer Research Unit, US Department of Agriculture, National Center for Agricultural Utilization Research, Agricultural Research Service, Polymer 43 (2002), pp. 5935-5947, which is also incorporated herein by reference.

Additionally, in some examples, fibers may be added to the mixture before, during, or after heating in order provide additional strength to the resulting expanded material. By way of example and not limitation, examples of fibers that can be added include hemp, cellulose, carbon, glass, polymeric, or other fibers.

A smoothing assembly 114 is configured to flatten the top surface of the foam surrounding the item to be packaged. The smoothing assembly 114 may be a roller, wiper, blade or other tool that smooths the top of the foam. The lower surface of the foam is flattened by the platen, to which the foam was applied. Accordingly, the top and bottom of the package are flattened.

A shellac or coating assembly 116 is configured to spray, wipe, and/or spread a layer or covering of shellac, plastic, sealant, paint, and/or other coating material over the smoothed foam surface of the package. The coating material is selected to allow printing, such as ink jet printing, to be applied to the top of the package. In some examples, the coating material may be transparent or translucent. In some examples, the coating material may be opaque.

A print head assembly 118 is configured to print addresses, postage and other information on the package. The print head assembly may use any technology, such as ink jet, dot matrix, laser, 3D printer, or other known or developed technology.

Figure 2:
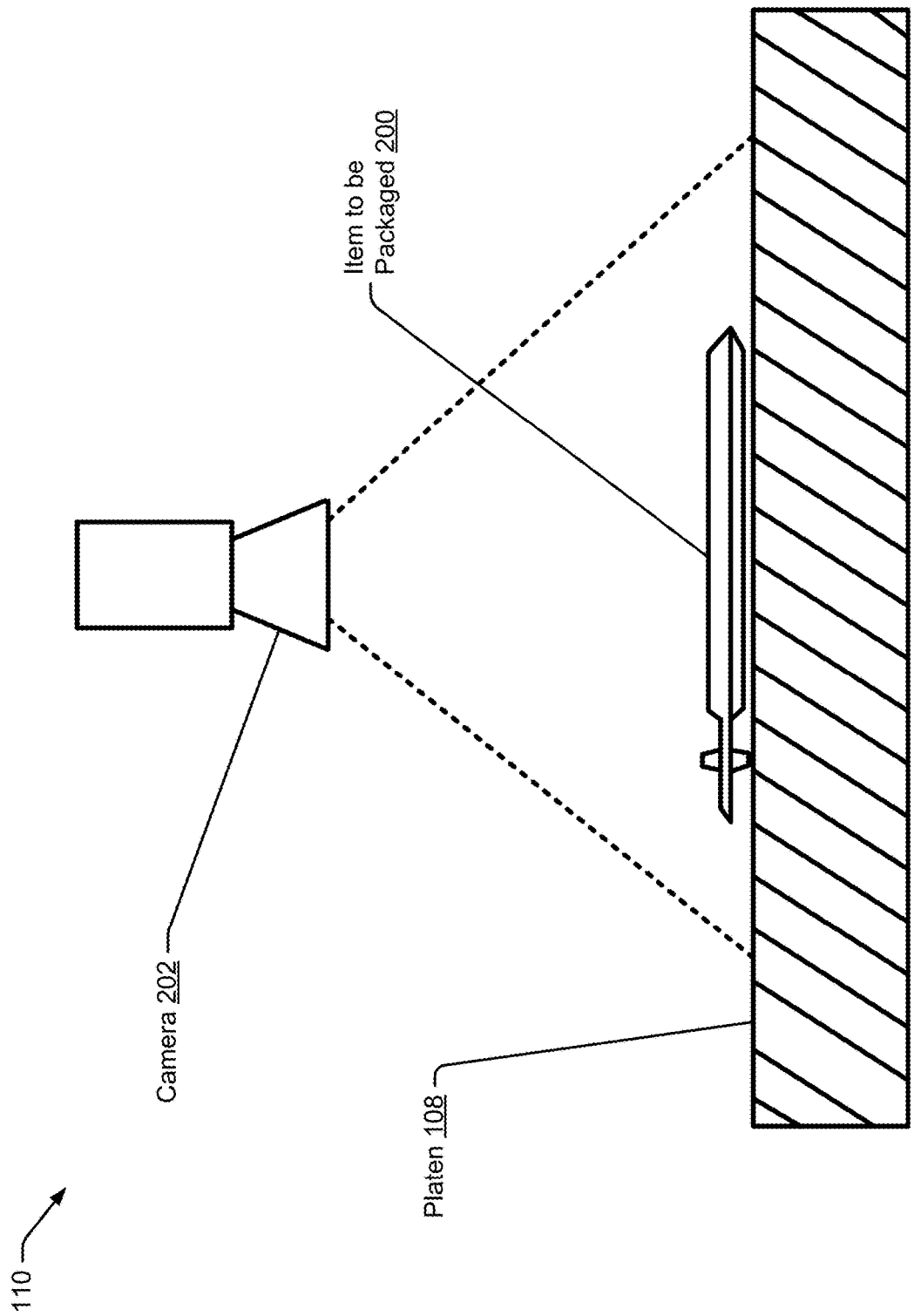
FIG. 2 is a diagram showing an example scanning apparatus, which may be used in the packaging system to determine size and/or shape of an item to be packaged.

FIG. 2 is a diagram showing a scanning assembly 110 configured to determine a size of the item 200 to be packaged. The scanning assembly 110 may also determine the nature or identity of the item, such as by reading a bar code, QR code, object recognition, or by identifying the packaging of the item. The scanning assembly 110 may include a camera 202, as well as a processor, memory and software to analyze images of the item 200.

Figure 3:
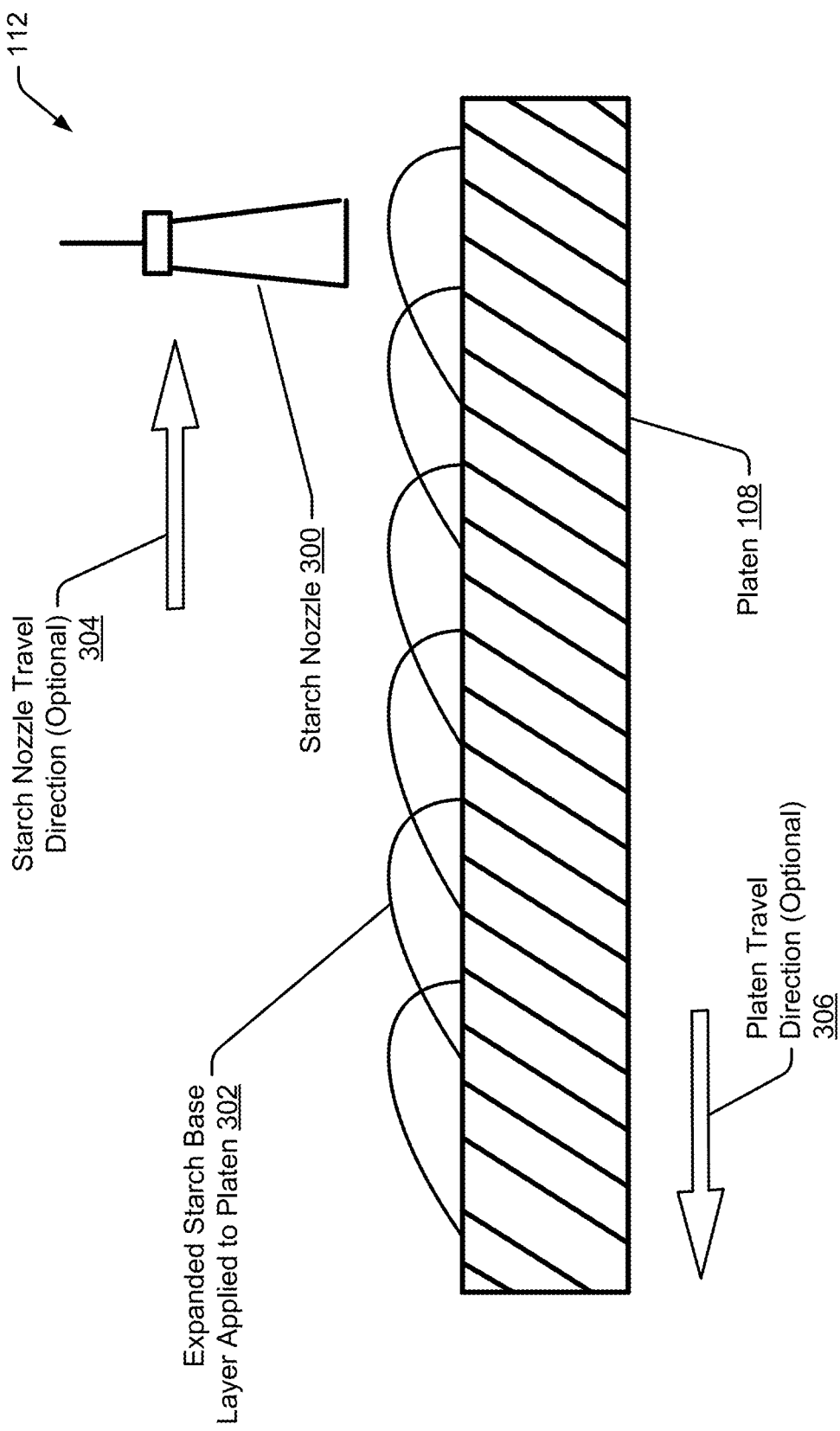
FIG. 3 is a diagram showing an example starch nozzle, which may be used in the packaging system, and which is shown laying down a base layer of starch to a platen.

FIG. 3 is a diagram showing an example expanded material assembly 112. In the example, a nozzle 300 is configured to provide starch, foam, or other expanded material to surround and protect the item to be packaged. In the example shown, the nozzle 300 had applied a layer 302 (e.g., a base layer) of starch or foam to the platen 108. In one example, the nozzle 300 moves in the direction 304 over the platen 108. Alternatively, the platen 108 may move (e.g., in direction 306) and the nozzle may remain stationary. Accordingly, one or both of the nozzle 300 and platen 108 moves, allowing the base layer of starch and/or foam to be applied to the platen 108. The size of the base layer 302 may be based on the size of the item to be packaged, which may have been determined by the scanning assembly 110 of FIG. 2.

Figure 4:
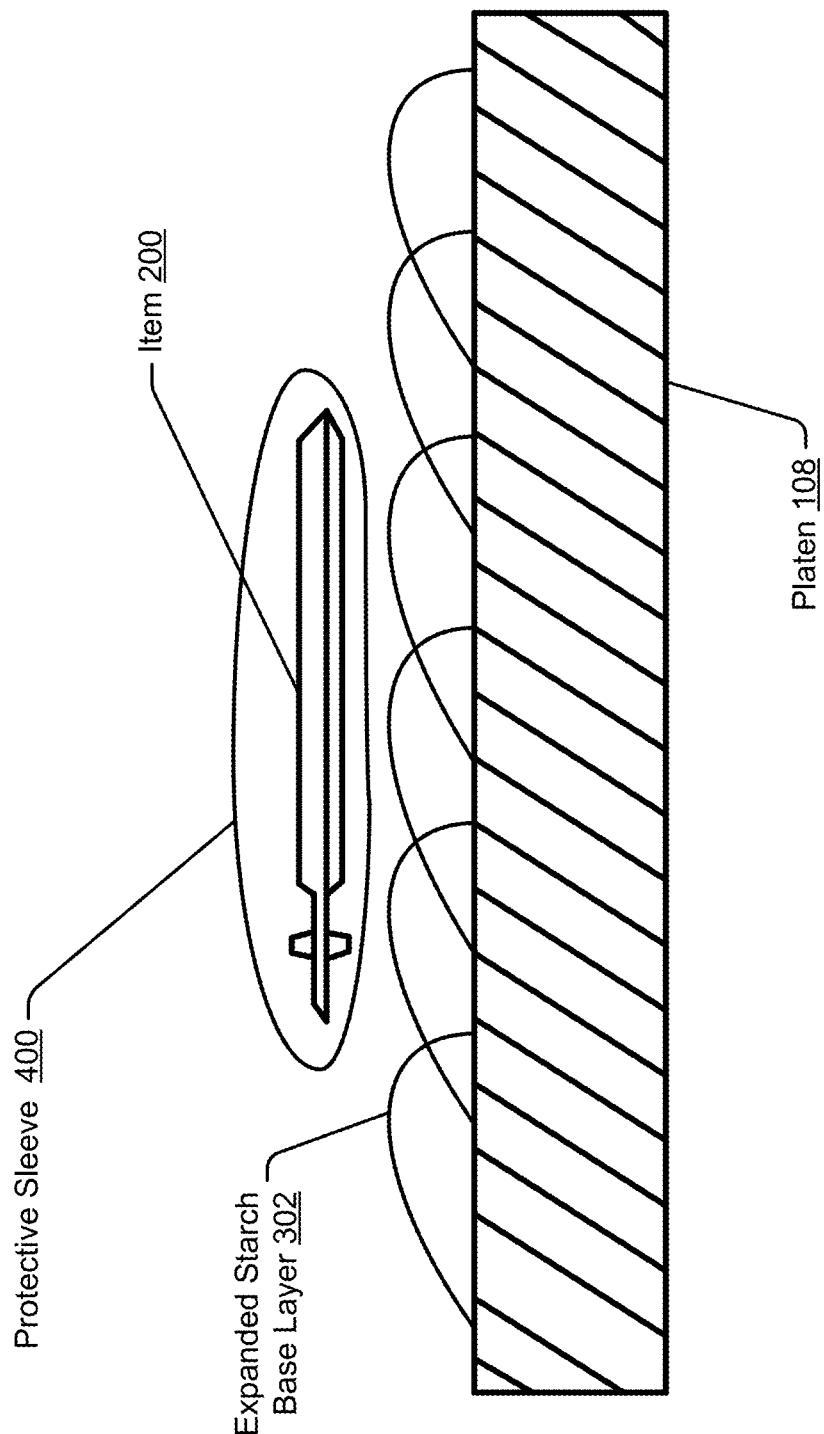
FIG. 4 is a diagram showing the item to be packaged encased in an example protective sleeve and placed on the base layer of starch.

FIG. 4 is a diagram showing the item 200 to be packaged encased in a protective sleeve 400 and placed on the base layer 302 of starch or foam. The foam or starch layer 302 is sufficiently dense and/or resilient to support or "float" the item 200 to be packaged, and to prevent the item from "sinking" through the foam and touching the platen 108.

Figure 5:
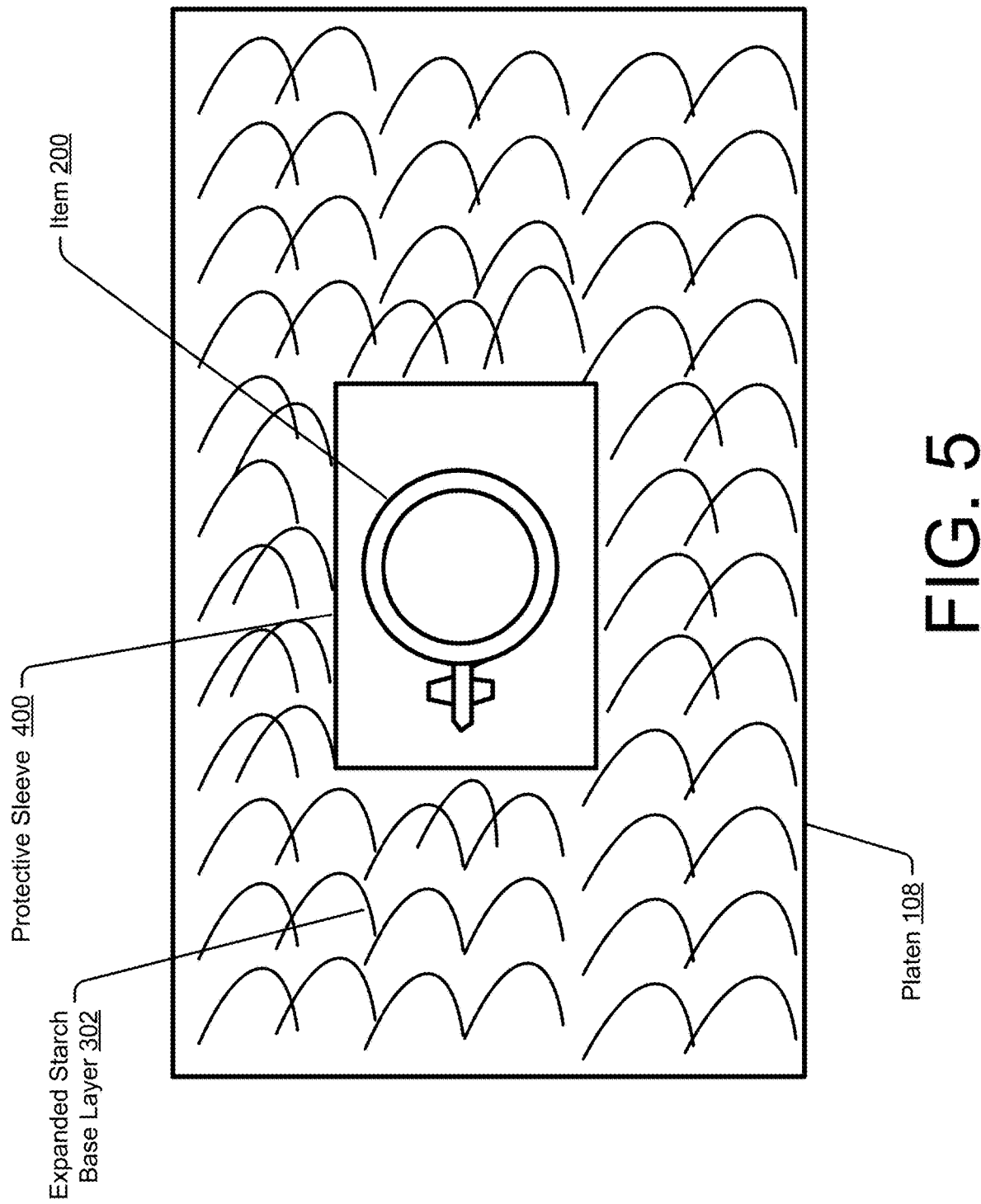
FIG. 5 is a diagram showing a top, or plan, view of the item within its protective sleeve and supported by the base layer of starch.

FIG. 5 is a diagram showing a top, or plan, view of the item 200 within its protective sleeve 400 and supported by the base layer 302 of starch or other foam material. The size of the layer 302 is determined by several factors, such as how much protection is required, the size required to print addressing information, the weight of the item, and/or other factors.

Figure 6:
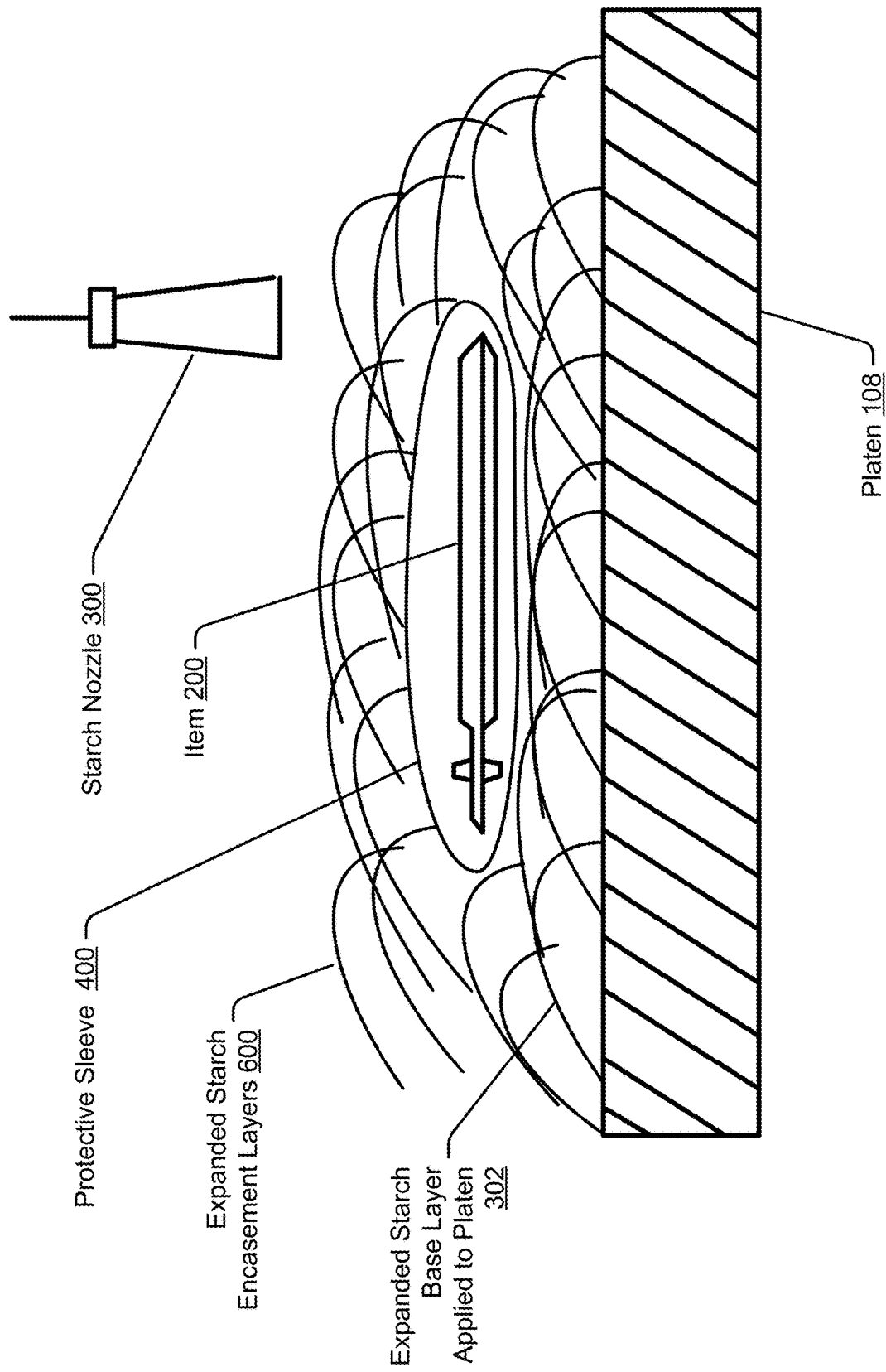
FIG. 6 is a diagram showing the item to be packaged, within its protective sleeve, and showing additional starch being applied over the item, to thereby surround and encase the item.

FIG. 6 is a diagram showing the item 200 to be packaged, within its protective sleeve 400, and showing additional starch or foam 600 being applied over the item, to thereby surround and encase the item. The foam base layer 302 and the starch or foam covering layers 600 combine as they set up, to form a protective covering of the top, bottom and sides of the item 200.

Figure 7:
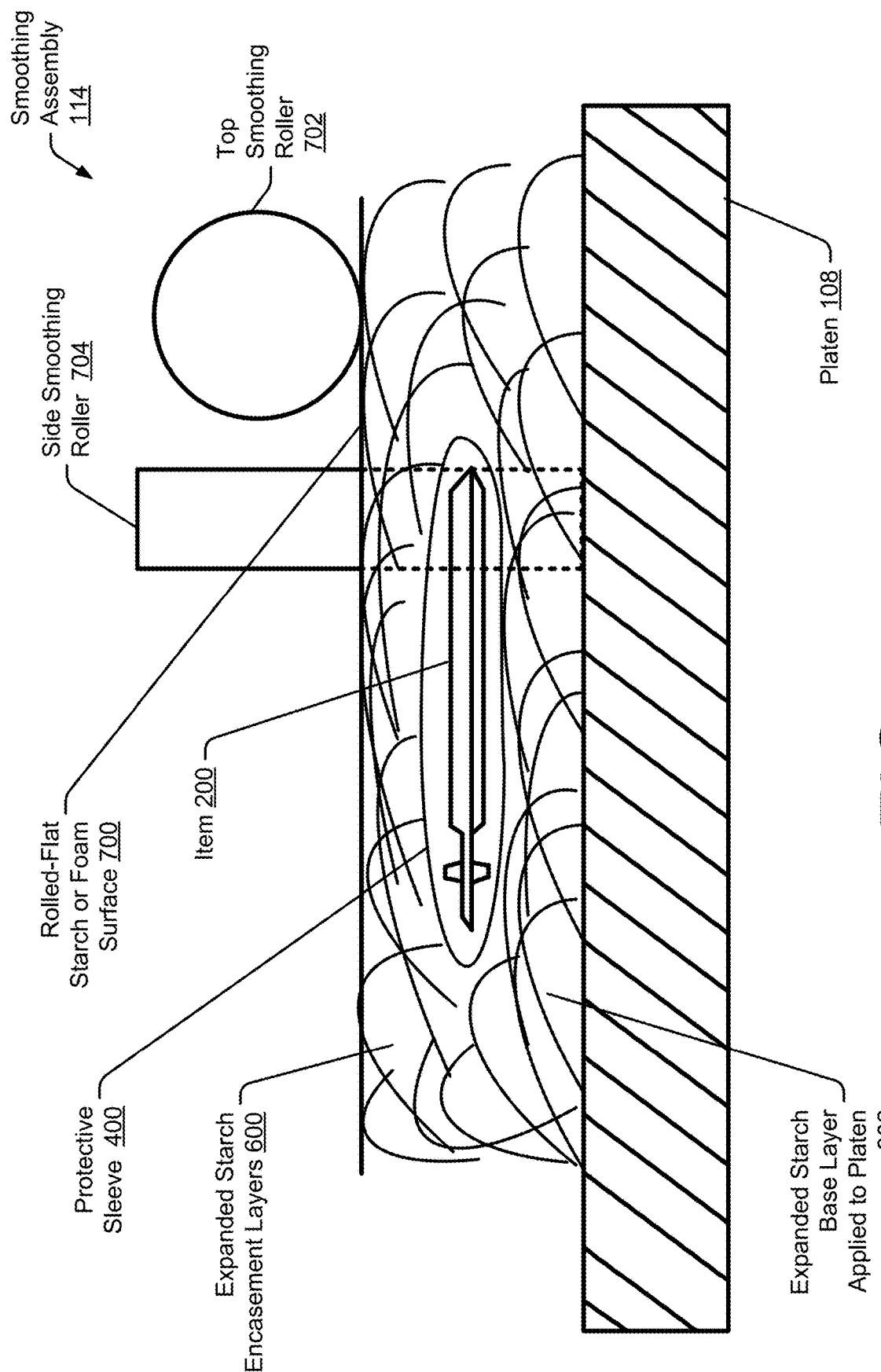
FIG. 7 is a diagram showing an example roller apparatus, which may be used in the packaging system to smooth and/or flatten one or more surfaces of the starch.

FIG. 7 is a diagram showing a smoothing assembly 114 configured to smooth and flatten the top of the layers 600 of foam applied to, and covering, the item 200 to be packaged. In some configurations, the smoothing assembly 114 may also smooth the sides the foam layers 302 and 600. The example shown includes a roller 702, which operates to create a flattened starch or foam surface 700. The roller 702 is an example of a device that may be used in the packaging system to smooth and/or flatten an upper surface of the starch. As an alternative, a flat surface (e.g., a "press" or plate, or other flat surface) may be pressed onto the top of the expanded starch encasement layer 600 before, during, or after it solidifies and hardens. As a still further alternative, the uneven top of the layer 600 may be sliced off by a blade, laser, hot wire, and/or water jet leaving a flat top 700 to the foam 302, 600.

The smoothing assembly 114 may also smooth the sides the foam layers 302 and 600. In the example of FIG. 7, a side-smoothing roller 704 is shown smoothing a side surface of the foam 302, 600. While not shown for reasons of clarity, additional rollers could be utilized to smooth additional side(s) of the expanded material.

Figure 8:
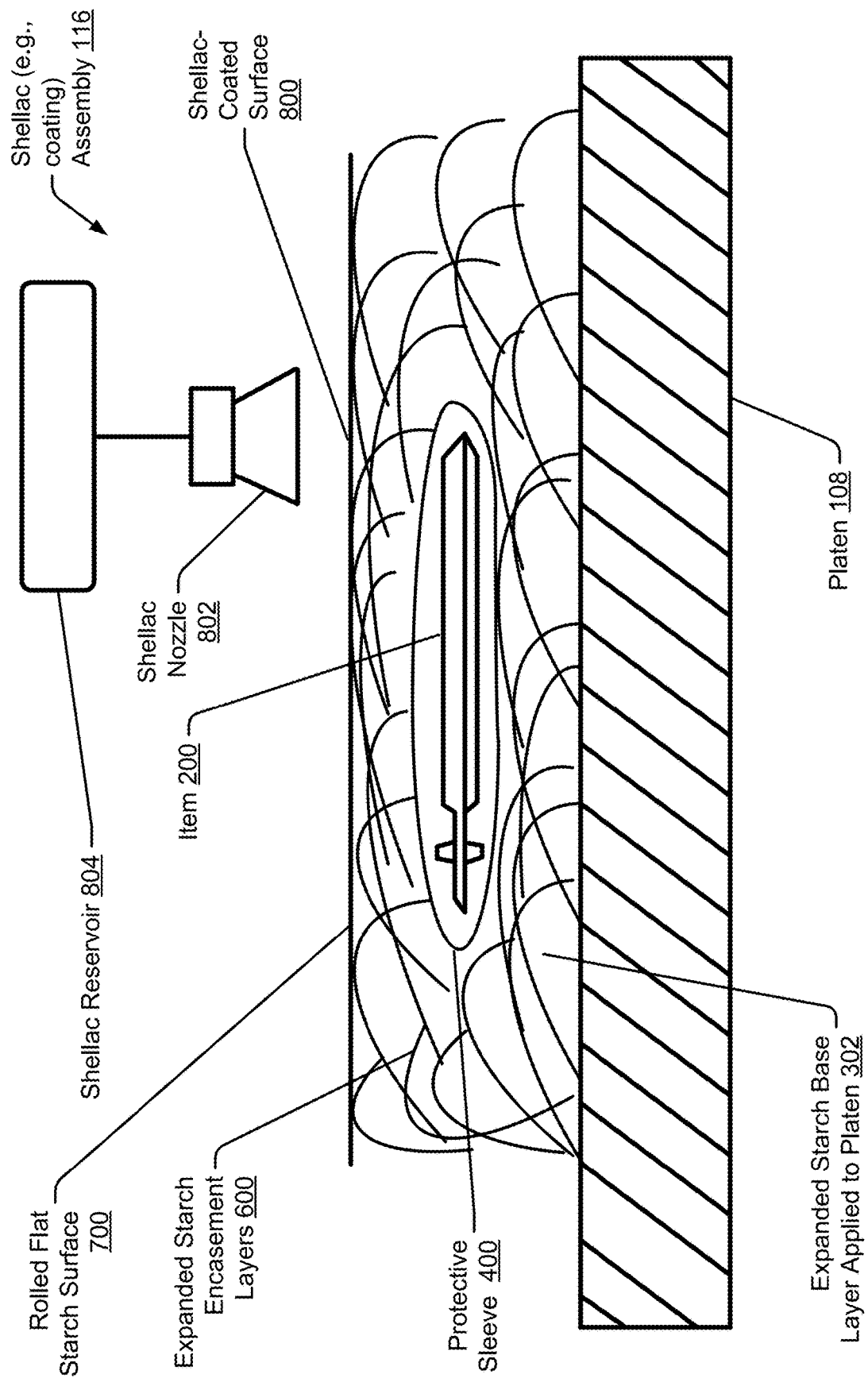
FIG. 8 is a diagram showing an example shellac nozzle and/or spray apparatus, which may be used in the packaging system to apply shellac, sealant, or other coating to an outer surface on the smoothed and flattened upper surface of the starch.

FIG. 8 is a diagram showing a shellac or coating assembly 116 that creates a shellac- or coated-surface 800 on the rolled-flat foam surface 700. Shellac, sealant, paint or other coating may be applied to create the surface 800. Selection of the coating to be used may depend on the nature of the foam/starch 302 and 600 used, and/or the ink to be applied to the coating. The coating 800 may be selected to dry or set up quickly, to allowing printing. In the example shown, a shellac nozzle 802 and shellac reservoir 804 are included in the shellac/coating assembly 114. Alternatively, a coating may be applied by a roller, brush and/or wiper, etc.

Figure 9:
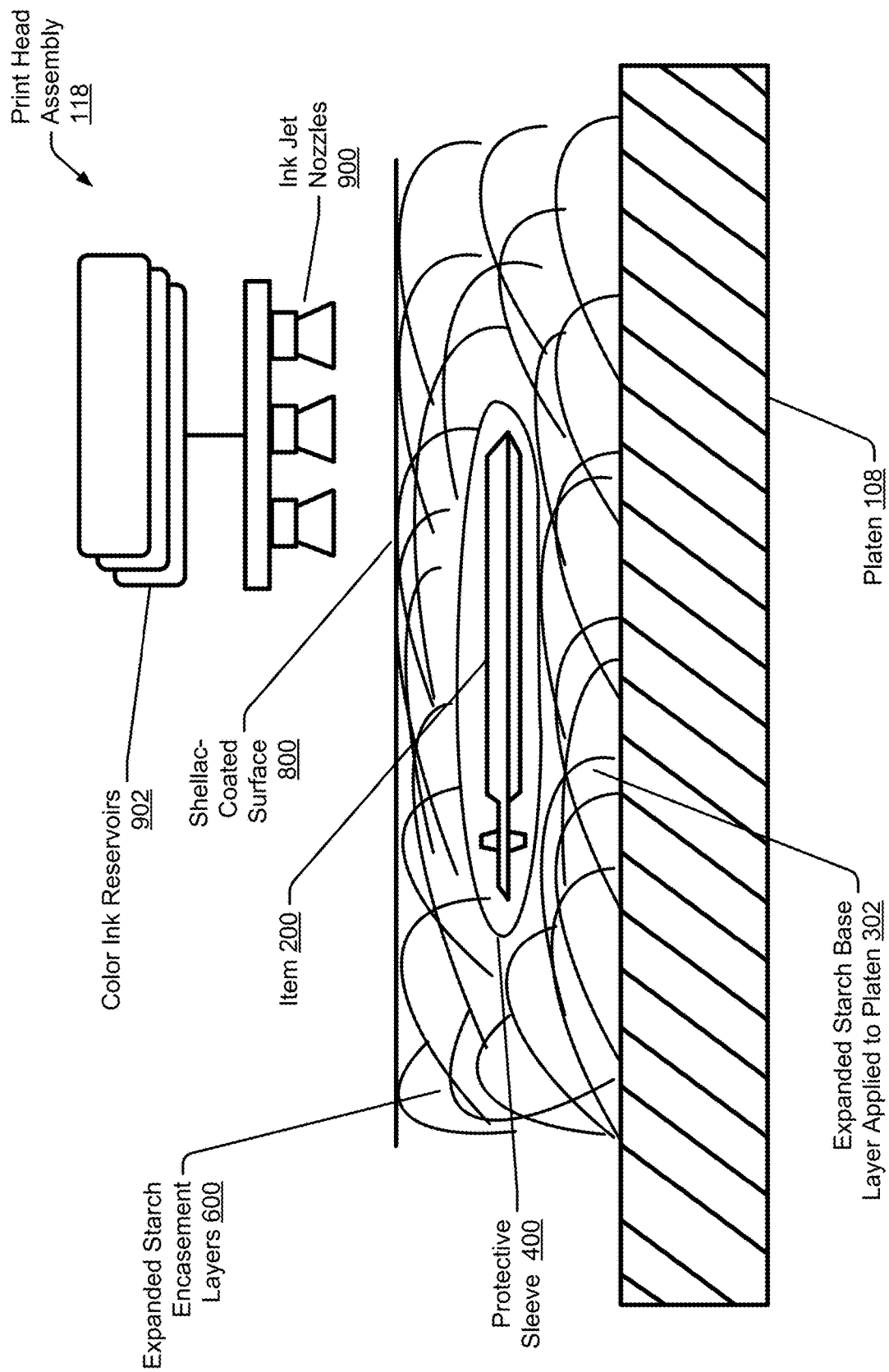
FIG. 9 is a diagram showing an example 2D printer (e.g., ink jet, laser, dot matrix, etc.), which may be used by the packaging system to print addresses, postage and/or other information on the smoothed, flattened, and/or shellac-covered surfaces of the package.

FIG. 9 is a diagram showing an example print head assembly 118 having an ink jet print head 900 and ink reservoirs 902. In the example shown, three-color jets 900 are shown; however, in other examples, only black ink is used. In the example, the print head assembly 118 may be used by the packaging system 100 to print addresses, postage and/or other information on the smoothed, flattened, and/or shellac-covered surface 800 of the package.

Figure 10:
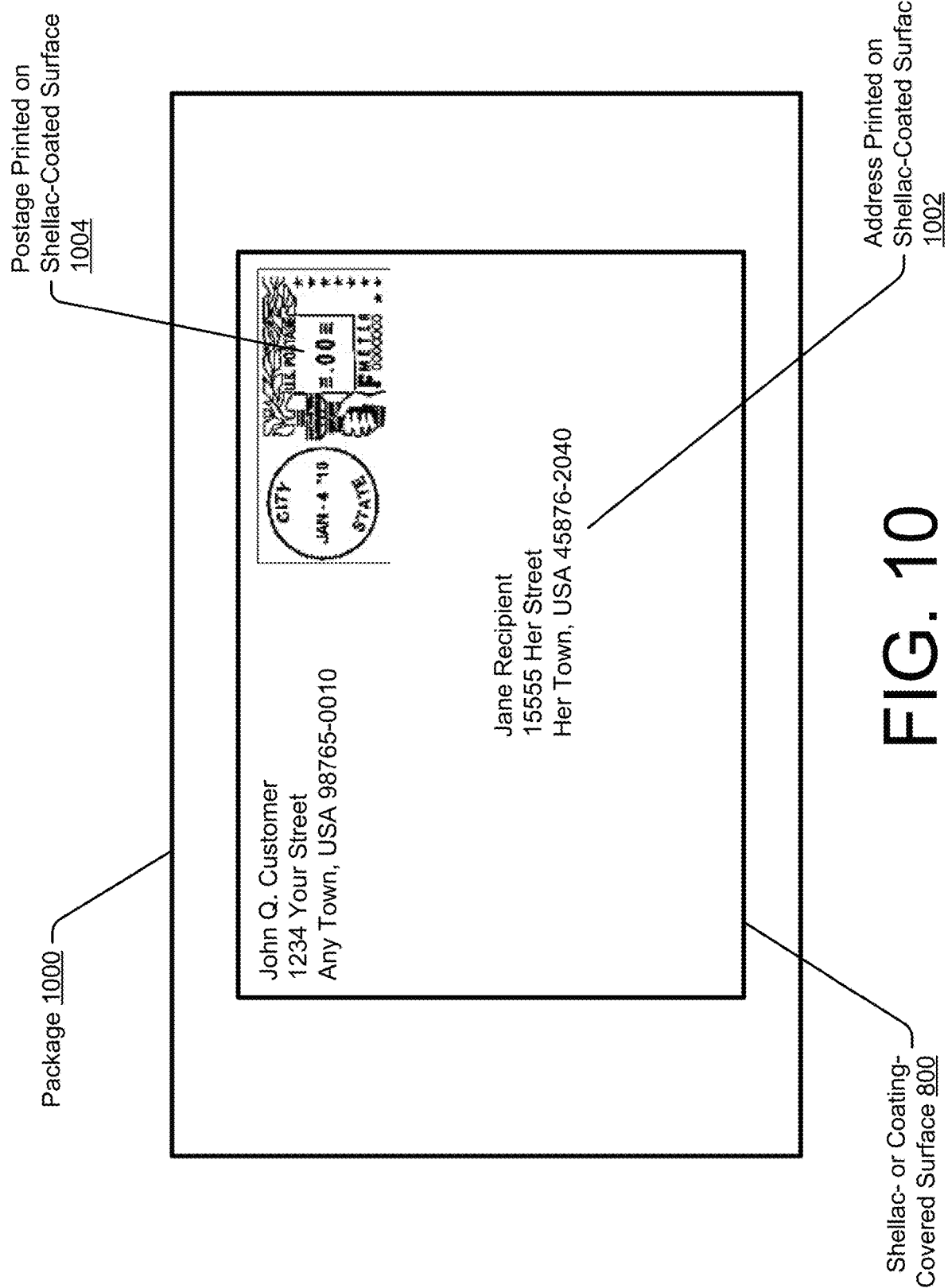
FIG. 10 is a diagram showing example printing on the top surface of a package.

FIG. 10 is a diagram showing example printing on the shellac or coating-covered top surface 800 of a package 1000. In the example shown, the address 1002 and postage 1004 have been printed onto the surface 800.

Example Methods and Operation

FIG. 11 is a flow diagram showing example techniques 1100 by which the expanded starch packaging and printing system may be operated. The techniques may be performed in an automated manner, such as controlled by operation of a processor 1102 and instructions defined in one or more memory devices 1104. Accordingly, the example system 100 of FIG. 1 may be controlled at least in part by the processor 1102 (defined in the system 100) and instructions defined in the memory device 1104.

At block 1106, a size and/or shape of the item to be printed is determined. In the example of FIG. 2, the camera 202 scans the item 200, and determines the item's size, shape, identity and/or other information.

At block 1108, a base layer of starch or foam is applied to a platen or other surface to support an item to be packaged. In the example of FIG. 3, the base layer 302 is applied by the starch nozzle 300 to the platen 108.

At block 1110, the item to be packaged is wrapped in a protective covering, such as plastic film, paper or other material. At block 1112, the wrapped item is placed on the base layer of starch or foam. In the example of FIG. 4, the item 200 and wrapper 400 are "floated" on the layer 302 of starch or foam 302.

At block, 1114, an additional layer of starch or foam is applied to the item "floating" in or on the first layer. The additional layer covers the item, thereby enclosing it in the foam. In the example of FIG. 6, the item 200 and wrapper 400 are floating on the first layer 302, and the additional layer 600 covers the item. The layers are still soft and malleable.

At block 1116, the top of the additional layer of starch and/or foam is smoothed or flattened. In the example of FIG. 7, the roller 114 smooths and flattens the top surface of the foam, thereby creating the smoothed, flat, rolled surface 700.

At block 1118, shellac, sealant, or other coating is applied to the flattened surface. In the example of FIG. 8, the shellac nozzle 802 applies a coating to the rolled surface 700, resulting in a shellac- or coating-covered surface 800, which is adapted to be printed.

At block 1120, addressing, postage and/or information is printed on the coated surface 800. In the example of FIG. 9, the print head assembly 118 prints onto the coated surface 800. The print head assembly 118 may include inject nozzles 900 or a printing assembly based on an alternative technology. In the example of FIG. 10, the package 1000 has flat front and back surfaces. The back surface is flat because the initial layer 302 was laid down on the platen 108. The front surface is flat because of operation of the roller assembly 114. The four side surfaces may also be smoothed by rollers or presses, or may be left in a somewhat uneven state. In some examples, after addressing, postage and/or information is printed at operation 1120, the process may return to operation 1118 to apply another coating of shellac, sealant, or other coating over the addressing, postage and/or information.

In the illustrated example, the shellac or other coating is applied at operation 1118 before the addressing, postage and/or information is applied to the package at operation 1120. However, in some examples, the addressing, postage and/or information may be printed on the rolled surface 700 of the package before the shellac, sealant, or other coating is applied is applied at block 1118. In some examples, the addressing, postage and/or information may be applied to the rolled surface 700 before the shellac, sealant, or other coating is applied and additional or alternative addressing, postage and/or information is printed on the coated surface 800 after the shellac, sealant, or other coating is applied is applied at block 1118.

FIG. 12 illustrates a system 1200 usable to implement 3D printed packaging of items. The system 1200 may be used to provide retail packaging for products that are for sale to consumers. The system 1200 may additionally or alternatively be used to provide non-retail packaging for items. In the case of non-retail packaging, the items may or may not already include some packaging (e.g., retail packaging).

In the example of FIG. 12, the system 1200 includes a computing device 1202 in communication with a 3D printer 1204A, a 2-D ink jet, dot matrix, and/or laser printer 1204B and a printer 1204C based on any technology available currently or in the future, and/or that is indicated by design requirements (printers 1204A, 1204B, and 1204C are referred to collectively herein as printers 1204). The computing device 1202 may also be in communication with the expanded material printing and/or packaging system 100 of FIG. 1, and which may form a part of the system 1200. The computing device 1002 may utilize one or more of the printers/packagers 100, 1204 to create and/or package an item. In a first example, a previously manufactured item may be placed in the scanning area 1210, and a package may be printed by operation of one or more of the printers 100, 1204A in the printing area 1212. In a second example, the 3D printer 1204A may create the item and print a package around the item. In a third example, the 3D printer 1204A may create the item, or it may have been previously manufactured, the expanded starch printing/packaging system 100 may print (e.g., extrude, pour, or spray) a package around the item, and the 2-D ink jet may print a label and/or postage on the package. Other combinations of item manufacturing, packaging and labeling may be performed, as indicated by design requirements, by the system 1200 and variations thereof, as discussed herein.

In the illustrated example, the system 1200 includes a scanner 1206 and an item manipulator 1208. However, in other examples, the scanner and/or manipulator may be omitted or combined with each other, the 3D printer 1204, and/or computing device 1202. When present, the scanner 1206 may comprise a 3D optical scanner, a 3D laser scanner, and/or one or more cameras to obtain information about an item, such as its visual appearance, outer dimensions, or the like. Numerous different scanners are available, such as, for example, the exaCT-s® CT Workstation or the Shapetracer Laser Line Scanner, both available from Wenzel America of Wixom, Mich., or the Artec Spikder, Artec L, or Artec EVA 3D Scanners available from Artec Group of Palo Alto, Calif. In some examples, the scanner 1206 may additionally or alternatively comprise an ultrasound scanner, an x-ray scanner, a spectrometer, a scale, and/or other scanning or sensing equipment to determine interior characteristics of the item, materials from which the item is made, weight of the item, volume of the item, density of the item, and the like.

In some examples, the computing device 1202 may "recognize" the item based on the scan. The computing device 1202 may recognize the item by, for example, reading a product identifier (e.g., universal product code or "UPC", model number, serial number, bar code, quick response code, or other identifier) of the item (if available), and then query a product catalog, model store, or other database to obtain additional information about the item. The computing device 1202 may additionally or alternatively recognize the item using object recognition (e.g., by comparing the scan or a vector representation of the scan to a database of reference scans or images of items). Once an item is recognized, the computing device 1204 may obtain additional information about the item such as a computer model of the item, a textual description of the item, product reviews of the item, human input information about the item, web pages related to the item, or any other available information about the item.

The item manipulator 1208 may comprise a robotic arm or other computer controlled manipulator. In some examples, the item manipulator 1208 may be specialized to move the item within the system 1200. For instance, the item manipulator 1208 may include specialized hardware (e.g., item engaging tools designed specifically for a particular type or shape of item) and/or software (e.g., customized code for a particular operation or set of operations). In that case the item manipulator 1208 may be capable of limited and/or predetermined motions. However, in other examples the item manipulator 1208 may comprise a robotic arm with a configurable or articulatable item-engaging tool or other manipulator having multiple degrees of freedom and capable of a wide range of motion. Numerous different manipulators are available depending on the specific tasks to be performed. In one specific example, a six-axis robotic arm, such as the Adapt Viper line of robotic arms available from Adept Technology, Inc. of Pleasanton, Calif. In some embodiments, the item manipulator 1208 may additionally or alternatively comprise a conveyor belt, rollers, or other mechanisms to move items from one location and/or orientation to another.

The computing device 1202, printers 1204, scanner 1206, expanded material printing and/or packaging system 100, and/or item manipulator 1208 are in communication with one another over a wired and/or wireless network. The network of system 1200 may be further connected to one or more other local and/or wide area networks, such as the Internet.

When an item is received, the item may be placed in a scanning area 1210, where the item may be scanned by the scanner 1206 to determine the nature of the item. Once the item has been scanned and the system 1200 has determined the nature of the item to be packaged, the item may be moved to a printing area 1212 where the item will be packaged by one of the printers 1204 and/or the expanded material printing and/or packaging system 100. The item may be packaged alone or with one or more other items (e.g., other items that are part of a same order and/or are to be shipped to the same location). Once the item(s) are packaged, the packaged item(s) may be output to an output area 1214 for storage, shipping, and/or further processing. The following description describes the process of packaging a single item. However, it should be understood that the process may also be used to print packaging for/around multiple items.

The computing device 1202 comprises one or more processors 1216 and memory 1218. The processor(s) 1216 and processing unit 1102 may comprise one or more microprocessors (e.g., central processing units, graphics processing units, etc.), each having one or more processing cores, one or more microcontrollers, or the like. The memory 1218 and 1104 may be configured to store one or more software and/or firmware modules, which are executable by the processor(s) 1216 and/or processing unit 1102 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The memory 1218 and/or 1104 may comprise computer-readable media and/or devices and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media includes hardware and does not include modulated data signals or carrier waves.

Referring back to FIG. 12, the memory 1218 includes a scanner module 1220, a modeling module 1222, a print module 1224, and manipulator module 1226, and a model store 1228. The scanner module 1220 may provide an interface (e.g., driver, application programming interface or "API," or the like) to the scanner 1206. For instance the scanner module 1220 may provide commands to control the scanner 1206 to obtain information about the item. The scanner module 1220 may additionally receive the output of scanner 1206 (i.e., the scanned image(s) or sensor data captured by the scanner 1206). From the output of the scanner 1206, the scanner module is able to generate an item model 1230 (if one did not already exist) or may select and/or supplement an existing item model 1230 (if one already exists). Once generated, selected, and/or supplemented, the item model 1230 may be stored in the model store 1228 or other repository for subsequent access by local and/or remote computing devices.

The modeling module 1222 generates a computer model of the packaging that is to be applied to the item. In other words, the modeling module 1222 determines the geometry and layout of the package that should be used to package the item, taking into account the item model 1230. The modeling module 1222 generates a packaging model 1232 describing the geometry layout of the package. The packaging model 1232 may be stored in the model store 1228. While the item models and packaging models are both shown as being stored in model store 1228 in this example, in other examples the item models and packaging models may be stored separately in memory 1218 or at one or more other data stores in communication with the computing device 1202. The modeling module 1222 may be a stand alone module, or may be a part of, an add-on to, or may otherwise integrate with, a 3D modeling program such as SolidWorks available from Dassault Systèmes SolidWorks Corp. of Waltham, Mass., Pro-Engineer available from PTC of Needham, Mass., or the like.

Print module 1224 may provide an interface (e.g., driver, application programming interface or "API," or the like) between the computing device 1202 and the printers 1204 and/or expanded material printing and/or packaging system 100. For example, the print module 1224 may include one or more printer drivers to provide commands for controlling the respective printers 1204 and/or expanded material printing and/or packaging system 100. Print module 1224 may control one or more of the printers 1204 and/or expanded material printing and/or packaging system 100 to generate packaging for the item according to packaging model 1232. The print module 1224 may control, among other things, the material or materials from which the package is to be printed, print speed of a print head of one or more of the printers 1204 and/or expanded material printing and/or packaging system 100, size and shape of packing material and/or an outer surface or shell of the package.

The manipulator module 1226 may provide an interface (e.g., driver, application programming interface or "API," or the like) between the computing device 1202 and the item manipulator 1208. For example, the manipulator module 1226 may be usable by the computing device 1202 to direct the item manipulator 1208 to move the item before, during and/or after printing the package. For instance, the manipulator module 1226 may direct the item manipulator to place the item into the scanning area 1210, to rotate or otherwise move the object in the scanning area 1210, to move the object from the scanning area 1210 into the printing area 1212, to rotate or otherwise move the object in the printing area 1212, and/or to remove the item from the printing area 1212.

The computing device 1202 also includes one or more network connections 1234 to connect the computing device 1202 to the other devices in the system 1200, as well as to one or more other local and/or wide area networks. In some examples, the network connections 1234 may allow a user, such as a purchaser of an item, to specify how the item is to be packaged for shipping to the purchaser or another intended recipient.

When the item is placed in the scanning area 1210, the scanner 1206 may scan the item. From the scan, the computing device 1202 may obtain information to determine the nature of the item from one or more sources. For instance, as discussed above, the computing device 1202 may recognize the item based on a product identifier or based on object recognition. If the computing device 1202 recognizes the item, the computing device 1202 may query one or more data sources to obtain additional information about the item. For instance, the computing device 1202 may reference the model store 1228 to determine whether or not a computer model of the item exists. If a computer model of the item exists, the computing device 1202 may reference an item model 1230 corresponding to the item to determine the geometry, materials, weight, volume, density, and/or other characteristics of the item. If a computer model of the item is not available, the computing device 1202 may scan the item using scanner 1206 to determine one or more characteristics of the item. In some instances the computing device 1202 may have or be able to obtain (e.g., through external resources via the Internet) a complete item model 1230 including exterior dimensions, interior dimensions, weight, volume, density, materials of construction, surface finish, and the like. In other instances, the computing device 1202 may have a limited or partial item model 1230, which describes less than all characteristics of the item. For instance, a limited or partial item model might only include exterior dimensions of the item.

Based on item model 1230 the item, modeling module 1222 may construct or obtain (e.g., through external resources via a network such as the Internet) a packaging model 1232 for the item. The modeling module 1222 may include a material palette 1236 defining the materials that are available from which to construct a package for the item. The modeling module 1222 may further include one or more packaging elements 1238, such as templates and previously stored design elements. For instance, packaging elements 1238 may include computer models of ribs, flanges, honeycomb structures, bubble structures, trusses, or other design elements, features, or parts. The modeling module 1222 may also include a physics engine 1240 to model forces that are likely to be applied by and/or to the item during storage, shipping, and/or sale. In one example, the physics engine 1240 may take into account characteristics of the item (e.g., size, shape, weight, fragility/durability, etc.) based on the item model 1230, material properties (e.g., strength, elasticity, ductility, hardness, etc.) of the item and available packaging materials from the material pallet 1236, forces to which the item may be exposed (e.g., gravity, inertia, impact, air resistance, etc.), and/or other factors (e.g., price, scarcity, shipping mode, storage location, intended use, etc.) obtained from item catalogs, product reviews, web sites, and/or other sources. In some instances, the physics engine 1240 may obtain such information for an item at least in part from a product identifier of the item. The foregoing description is of just one example, and in other examples, the physics engine 1240 and modeling module 1222 may obtain information needed to perform their respective functions directly or indirectly from the enumerated sources, or from other available sources.

Based on the foregoing criteria, modeling module 1222 may generate the packaging model 1232 customized for the item to withstand the forces that are likely to be applied. For example, the physics engine 1240 may determine that, based on a strength and weight of the item and a distance that the item is likely to be dropped during shipping, the packaging should be able to withstand a certain impact force. In another example, the physics engine 1240 may determine that, based on the strength and weight item and a number of items that are commonly stacked on top of one another, the packaging should be able to support a certain static load. In some examples, the physics engine 1240 may employ finite element analysis (FEA) or other mathematical techniques to model static and/or dynamic systems in which the item may be used/stored/shipped and/or the forces to which the item is likely to be exposed.

In other examples, instead of computing the forces to which the item is likely to be subjected, the physics engine 1240 may categorize the item into one or more categories and may apply predetermined packaging rules, designs, or templates corresponding to the one or more categories. For instance, if the item has a density less than a certain threshold the physics engine 1240 may categorize the item as being a "light weight" item. The physics engine 1240 may further categorize the item as being a "fragile" item if, for example, it has relatively thin spans of material, is made of a brittle or low strength material, or is for other reasons susceptible to damage. The physics engine 1240 may then identify (e.g., from a look up table or matrix) one or more packaging structures to use for the item based on the categorizations of "light weight" and "fragile." The physics engine may further modify or customize the packaging structures based on, for example, the size, weight, or other characteristics of the item. For instance, the physics engine 1240 may determine a packing structure or combination of packing structures (e.g., bubble and web structures in this example) to use to package an item based on its categorization (e.g., "light weight" and "fragile"). The physics engine 1240 may then adjust the number of packing structures (e.g., number of bubbles and/or webs, in this example), size of packaging structures (e.g., width, height, thickness, diameter, etc.), quantity of material used to generate the packing structures (e.g., mass or volume), the material from which the packing structures are constructed (e.g., hard plastic, elastomer, metal, etc.), and/or other characteristics of the packing structures (e.g., corner rounding, gussets, fillets, etc.) according to the characteristics of the item. In some embodiments, the physics engine 1240 may additionally or alternatively take into account the value of the item, constraints on the cost of the package (e.g., what the customer is willing to pay), constraints on the size and/or weight of the package (e.g., due to postal or other delivery requirements), or other considerations.

In some examples, before and/or after the item is placed in the printing area 1212, the item may have a release applied so that the packaging does not stick to or damage the item. In one example, the computing device 1202 may instruct the item manipulator to apply the release to the item, while in other examples the release may be applied to the item by another device or process prior to or after being placed in the printing area 1212. In some examples, the release may comprise a chemical or material (e.g., corn starch, wax, paper, metal foil, plastic, etc.) applied to item to prevent the packaging material from adhering or bonding to the item. In other examples, the release may comprise a property imparted to the item (e.g., an electrostatic charge, a polished surface finish, a cold temperature, electromagnetic radiation, etc.) that helps to prevent the packaging material from adhering or bonding to the item. In still other examples, the release may be omitted (e.g., if the 3D printed packaging material does not adhere to the material of the item, if a gap is maintained between the item and the packaging material during printing, and/or if it is desired that the packaging material adhere or bond to the item). In still other examples, a release may be applied to some parts of an item but not other parts, such as limited corners or edge points of the item to allow the package to adhere to, or form a weak bond with, the item (e.g., to secure the package to the item during shipping). In such an example, the limited corners or edge points that are not coated with the release may be sized and positioned such that the adhesion or weak bonds may be easily broken upon opening the package to separate the item from the package. The release may be applied before, during, or (in the case where part of the package is printed before the item is placed in the printing area) after the printing process commences.

Once the packaging model 1232 has been generated and the item is otherwise ready for packaging (e.g., any desired release has been applied, any other items that are to be packaged with the item are present, etc.), the computing device 1202 may initiate the printing process. In some examples, the item may be placed in the printing area 1212 before printing commences and the package may be printed around the item. In other examples, at least a portion of a package may be printed before the item is placed in the printing area 1212. For instance, the computing device 1202 may instruct one or more of the printers 1204 and/or expanded material printing and/or packaging system 100 (e.g., via print module 1224) to print a bottom or side surface and/or one or more support structures of a package prior to instructing the item manipulator 1208 (e.g., via the manipulator module 1226) to place the item into the printing area 1212. The item manipulator 1208 may then place the item into/onto the partially printed package (e.g., onto already printed support structures and/or into an already partially printed shell of a package), the computing device 1202 may then cause one or more of the printers 1204 and/or expanded material printing and/or packaging system 100 to print the remainder of the package around the item.

In some examples, the package printed by the printing process may be one continuous part. In that case, the package may completely encapsulate the item or may cover only part of the item. In the case that the package encapsulates the item, the package may provide an air and/or water tight package. In some examples, the package may be hermetically sealed. Because the package is printed, the package may be seamless, minimizing chances that the package will catch on surfaces it comes into contact with and consequently minimizing the chances of damage to the package or the surfaces with which it comes into contact. The seamless surfaces of the package may also improve material handling capabilities. For instance, the seamless surfaces of the package may make the package easier to slide on conveyors, easier to pick up (e.g., with suction devices or grippers), easier to stack and load, etc. The seamless appearance may also provide a clean, aesthetically appealing appearance.

In other examples, the package maybe printed as multiple parts to facilitate opening or unpackaging the item. For instance, the package may comprise multiple parts that fit together like a 3D puzzle and/or are held in place by one or more other parts. Additionally or alternatively, the package may include one or more opening features to help assist in the opening of the package. By way of example and not limitation, the package may include one or more thinned or frangible regions where the package is configured to separate during opening, one or more tabs or finger holds configured to be grasped by a user, or the like.

The package may additionally or alternatively include one or more of the following features:

- thermal insulation (e.g., regions of material having a low coefficient of thermal conductivity such as wood, polystyrene, cellulose or glass fiber insulation, air or other gasses, and/or a vacuum) and/or electrical insulation (e.g., dielectric material);
- vibration damping (e.g., regions of viscoelastic material such as rubber, silicone, synthetic polymers, wood, or composites including any of the foregoing);
- crumple zones (e.g., features designed to fail before the rest of the package) to absorb energy of impacts;
- child safety features (e.g., features requiring more strength, instruction reading ability, and/or dexterity to open than a typical child possesses);
- tamper resistant and/or tamper evident features (e.g., features that will clearly show once the package has been opened or tampered with, such as for example, 2-D or 3D water marks, frangible regions that will break if tampered with, materials or indicators that change color or otherwise indicate when they are exposed to air or humidity, ink or dye in the package that if punctured will discolor the package indicating the tampering);
- desiccant material (e.g., received in pockets, pouches, or receptacles printed in the package and/or the package itself may be printed in whole or in part of a desiccant material);
- all or part of the package may form an accessory for the item (e.g., a charging stand for an electronic device, a cover for an electronic device, a pill holder for medication, etc.); and/or
- the package may be made in whole or in part of a recyclable material (e.g., thermoplastic, glass, metal, ceramic, etc.), biodegradable material (e.g., cellulose based materials, sand with organic binder such as glycerin, etc.), and/or water soluble material (e.g., sucrose, glycerin, starch based materials, gelatin, etc.) such that the entire package may be recycled and/or disposed of without any subsequent sorting or separating.

During or after printing the package structure, one or more pieces of information may be printed onto the package. The information may include, for example, shipping information (e.g., sender and/or recipient address), postage for the package, a packing list of the item(s) in the package, shipping instructions (e.g., "fragile", "this end up," etc.), opening instructions, set up or assembly instructions, "quick-start instructions," description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3D relief code, or the like), a date on which the package was printed, a location at which the package was printed, an entity that printed the package, an identifier of the printer that printed the package, or any other pertinent information. The information may be printed in 2-D or 3D by one or more of the printers 1204, by the expanded material printing and/or packaging system 100, and/or by a 2-D printer located in or proximate the printing area 1212.

Example Systems and Methods

In an example, a package comprises one or more printed layers of expanded starch material. The package of any preceding example, may further comprise: a base; and a top, wherein the one or more layers of expanded starch material are interposed between the base and the top. The package of any preceding example, wherein the base comprises a substantially planer sheet of material. The package of any preceding example, wherein the top comprises a substantially planer sheet of material. The package of any preceding example, wherein at least one of the base or the top comprises a 3D printed component. The package of any one of any preceding example, wherein the base comprises at least one of paper, card stock, cardboard, plastic sheet, plastic film, or 3D printed material. The package of any one of any preceding example, wherein the top comprises at least one of paper, card stock, cardboard, plastic sheet, plastic film, or 3D printed material. The package of any one of any preceding example, wherein at least one of the base or the top comprises biodegradable material. The package of any one of any preceding example, wherein at least one of the base or the top comprises compostable material. The package of any one of any preceding example, wherein at least one of the base or the top comprises recyclable material. The package of any one of any preceding example, wherein at least one of the base or the top is adhered to the one or more layers of expanded starch material. The package of any one of any preceding example, wherein the one or more layers of expanded starch material comprise multiple layers of expanded starch material. The package of any one of any preceding example, further comprising a protective coating. The package of any preceding example, wherein the protective coating comprises a shellac. The package of any one of any preceding example, wherein the protective coating is at least one of biodegradable or compostable. The package of any one of any preceding example, further comprising one or more sides. The package of any preceding example, wherein the one or more sides comprise at least one of paper, card stock, cardboard, plastic sheet, plastic film, or 3D printed material. The package of any preceding example, further comprising an item at least partially enclosed in the one or more layers of expanded starch material. The package of any one of any preceding example, further comprising an item fully encapsulated in the one or more layers of expanded starch material. The package of any one of any preceding example, wherein at least one of the one or more layers of expanded starch material is printed in a negative space around the item.

A system for packaging an item, the system comprising: a print head having one or more nozzles for printing expanded starch material, an optical scanning device, and a starch boiler.

The system of any preceding example, further comprising at least one of: a top sheet applicator, a bottom sheet applicator, a shellac reservoir and applicator, a smoothing roller, a print head for two-dimensional printing, or a print head for three-dimensional printing.

A method of packaging an item by applying one or more layers of expanded starch material according to any combination of the techniques shown and described herein.

A method of packaging an item, comprising: determining a size of the item; applying a base layer of foam, based at least in part on the size of the item; wrapping the item; locating the wrapped item on the base layer; applying an additional layer of foam to the item; smoothing the additional layer; coating the smoothed additional layer; and printing an address on the smoothed and coated additional layer.

What is claimed is:

1. A method of packaging an item, comprising:
    scanning the item to determine a size of the item;
    printing a base layer of expanded material, based at least in part on the size of the item;
    placing the item on the base layer;
    printing one or more additional layers of expanded material on the base layer, the one or more additional layers of expanded material at least partially enclosing the item, wherein the one or more additional layers comprise:
        a top disposed on a second side of the item opposite the base layer; and
        one or more printed layers of expanded starch material interposed between the base layer and the top;
    applying a substantially planer sheet of material to at least one of the base layer or the top; and
    smoothing at least one of the one or more additional layers of expanded material.

2. The method of claim 1, further comprising coating one or more surfaces of a package formed by the method with a protective coating, the protective coating comprising at least one of a shellac, a sealant, or paint.

3. The method of claim 1, further comprising applying a protective coating to the item prior to placing the item on the base layer.

4. The method of claim 1, wherein the expanded material comprises an expanded starch material.

5. The method of claim 1, wherein at least one of the base layer or the top comprises biodegradable material or compostable material.

6. The method of claim 1, wherein at least one of the base layer or the top is adhered to the one or more printed layers of expanded starch material.

7. The method of claim 1, wherein the one or more printed layers of expanded starch material comprise multiple printed layers of expanded starch material.

8. The method of claim 1, wherein at least one of the one or more printed layers of expanded starch material is printed in a negative space around the item.

9. The method of claim 1, wherein the printing comprises:
    heating a starch mixture; and
    expelling the starch mixture from a print head as an expanded starch material.

10. The method of claim 1, wherein applying the substantially planer sheet of material to at least one of the base layer or the top comprises:
    applying a top sheet of material to a top layer of the one or more additional layers; and
    applying a bottom sheet of material to the base layer.

11. The method of claim 1, further comprising at least one of:
    printing with a two-dimensional printer on a surface of a package formed by the method; or
    printing with a three-dimensional printer on the surface of the package formed by the method.

12. A method of printing a package for an item, the method comprising:
    applying a base;
    placing the item to be packaged on the base;
    printing one or more layers of expanded starch material on the base, the one or more layers of expanded starch material at least partially enclosing the item;
    applying a top to a side of the one or more layers of expanded material opposite the base; and
    applying a substantially planar sheet of material to at least one of the base or the top.

13. The method of claim 12, wherein the at least one of the base or the top comprises a 3D printed component.

14. The method of claim 12, wherein the at least one of the base or the top comprises paper, card stock, cardboard, plastic sheet, plastic film, sheet metal, or metal foil.

15. The method of claim 12, wherein the at least one of the base or the top comprises biodegradable material or compostable material.

16. The method of claim 12, wherein at least one of the base or the top is adhered to at least one of the one or more printed layers of expanded starch material.

17. The method of claim 12, further comprising smoothing at least one of the one or more layers of expanded starch material.

18. A method of packaging an item, comprising:
    scanning the item to determine a size of the item;
    printing a base layer of expanded material, based at least in part on the size of the item;
    placing the item on the base layer;
    printing one or more additional layers of expanded material on the base layer, the one or more additional layers of expanded material at least partially enclosing the item;
    smoothing at least one of the one or more additional layers of expanded material;
    applying a top sheet of material to a top layer of the one or more additional layers; and
    applying a bottom sheet of material to the base layer.

* * * * *